(12) United States Patent
Zhou et al.

(10) Patent No.: US 8,657,996 B2
(45) Date of Patent: Feb. 25, 2014

(54) METHODS OF USING COMBINATIONS OF A LIPASE AND AN OXIDANT FOR PITCH CONTROL IN PAPER MAKING PROCESSES AND PRODUCTS THEREOF

(71) Applicant: Buckman Laboratories International, Inc., Memphis, TN (US)

(72) Inventors: Xiangdong Zhou, Memphis, TN (US); Percy Jaquess, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 0 days.

(21) Appl. No.: 13/866,253

(22) Filed: Apr. 19, 2013

(65) Prior Publication Data

US 2013/0340959 A1 Dec. 26, 2013

Related U.S. Application Data

(60) Provisional application No. 61/662,955, filed on Jun. 22, 2012.

(51) Int. Cl.
*D21C 5/02* (2006.01)

(52) U.S. Cl.
USPC ...... 162/8; 162/32; 162/72; 162/74; 162/132; 162/141

(58) Field of Classification Search
USPC ............. 162/8, 72, 74, 76, 32, 132, 141, 6, 7, 162/78, 168, 199, 272
See application file for complete search history.

(56) References Cited

U.S. PATENT DOCUMENTS

| | | | |
|---|---|---|---|
| 5,256,252 | A | 10/1993 | Sarkar et al. |
| 5,356,800 | A | 10/1994 | Jaquess |
| 5,507,952 | A | 4/1996 | Jaquess et al. |
| 5,667,634 | A | 9/1997 | Fujita et al. |
| 6,074,863 | A | 6/2000 | Svendsen et al. |
| 7,407,561 | B2 | 8/2008 | Song et al. |
| 7,862,688 | B2 | 1/2011 | Thomas |
| 8,048,268 | B2 | 11/2011 | Jiang et al. |
| 2002/0059998 | A1 | 5/2002 | Glover et al. |
| 2002/0137655 | A1 | 9/2002 | Johansen et al. |
| 2006/0048908 | A1 | 3/2006 | Wang et al. |
| 2008/0169073 | A1 | 7/2008 | Xu et al. |
| 2009/0065159 | A1 | 3/2009 | Xu et al. |
| 2010/0269989 | A1 | 10/2010 | Wang et al. |
| 2011/0094695 | A1 | 4/2011 | Jiang et al. |

FOREIGN PATENT DOCUMENTS

| | | |
|---|---|---|
| CA | 2335253 A1 | 12/1998 |
| WO | 03035972 A1 | 5/2003 |

OTHER PUBLICATIONS

International Search Report and Written Opinion issued in corresponding International Patent Application No. PCT/US2013/037286 dated Jun. 28, 2013 (9 pages).

*Primary Examiner* — Mark Halpern
(74) *Attorney, Agent, or Firm* — Kilyk & Bowersox, P.L.L.C.

(57) ABSTRACT

A method is provided for controlling deposit-forming contaminants that comprise pitch or other fiber components which can interfere with the processing of the fibers, reduce paper quality, or both in papermaking systems. The method includes contacting fibers with a lipase and at least one peroxide source-free oxidant, and optionally nonionic surfactant, to liberate the organic contaminants from the fibers. Paper products of the method are also provided.

51 Claims, 1 Drawing Sheet

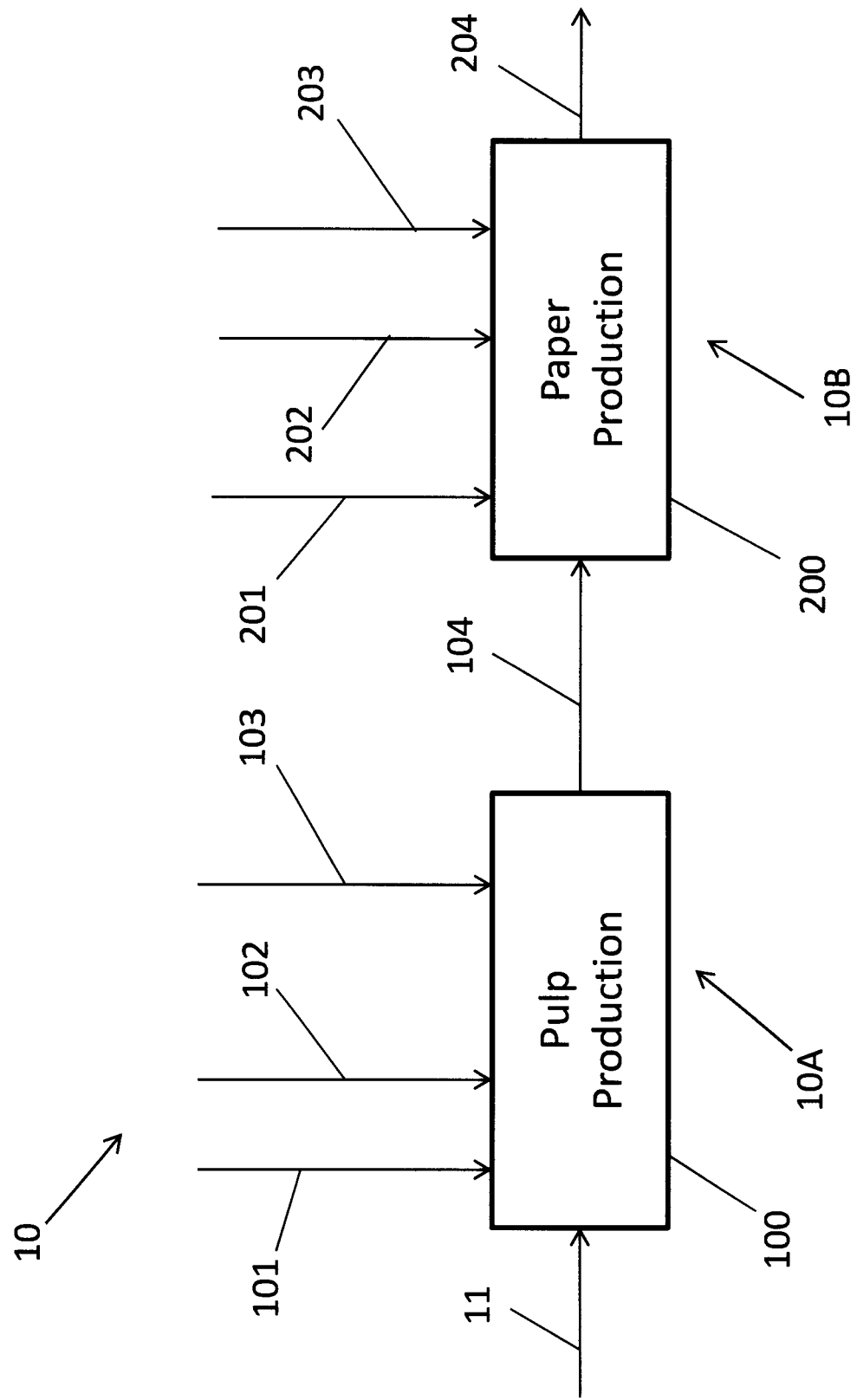

METHODS OF USING COMBINATIONS OF A LIPASE AND AN OXIDANT FOR PITCH CONTROL IN PAPER MAKING PROCESSES AND PRODUCTS THEREOF

This application claims the benefit under 35 U.S.C. §119(e) of prior U.S. Provisional Patent Application No. 61/662,955, filed Jun. 22, 2012, which is incorporated in its entirety by reference herein.

FIELD OF THE INVENTION

The present invention relates to a method for controlling deposit-forming organic contaminants, such as pitch, that can interfere with processing of fibers and/or reduce paper quality in paper making systems. More particularly, the present invention relates to a method for controlling such organic contaminants by contacting fibers with a lipase and at least one peroxide source-free oxidant to liberate the organic contaminants from the fibers. The present invention also relates to paper products made with fiber materials treated with these components.

BACKGROUND OF THE INVENTION

Lignocellulosic material in fiber form is in wide commercial use as a raw material used for the manufacture of paper and other paper products. In paper making, wood fibers that are obtained from pulping fiber source materials usually are treated by combining them with other additives, and the fibers are then processed into a network of wood fibers, which can constitute a paper or other thin sheet of fibrous material.

Wood contains pitch and/or other extractives in addition to its main components cellulose, hemicelluloses, and lignin. Pitch refers to a variety of naturally occurring, hydrophobic, organic resins of low and medium molecular weight in wood fiber which include esters of fatty acids with glycerol (such as the triglycerides), as well as other fats, fatty acids, sterols, steryl esters, resin acids, and waxes, and to the deposits that these resins can cause during pulping and paper making processes. Pitch is typically located in parenchyma cells and on the surfaces of the fiber. Pitch composition can vary depending on the season and the type of wood, and some wood species may create greater pitch problems during pulping and papermaking than other species. Generally, pitch content from about 1 wt % to about 10 wt % can be encountered for virgin wood fiber used in paper making processes. Based on solubility in ethyl ether values, for example, pitch may comprise, for example, from about 0.7 to about 2.4 weight percent of hardwoods such as beech and white birch, and from about 0.7 to about 4.3 weight percent of softwoods such as eastern hemlock and jack pine, based on the total weight of unextracted (oven-dry) wood.

Pitch and other deposit-forming organic contaminants from wood fibers, even if only present in relatively small amounts, can cause problems in paper making systems that are significant and disproportionately larger than their relative concentrations. Pitch deposits may occur throughout a pulp or paper mill and these deposits can both degrade product quality and impair production rates. Pitch can cause problems in paper machines, for example, by sticking to rollers or other process equipment, and causing spots or holes in the paper material. Pitch also can impair production rates by decreasing the efficiency of pulp washing, screening, centrifugal cleaning, and refining, and disrupting many paper machine operations. Pitch can degrade the product paper by causing spots, holes, picking, and scabs in the final paper product or sheet. Pitch deposition on process equipment in paper making systems using virgin pulp supplies also can result in operational problems and production inefficiencies. Pitch can deposit, for instance, on screens used in the process line to reduce their throughput, and/or on process control devices, rendering them inoperable, such as instrument probes. Deposition of the pitch can occur not only on metal surfaces in the system, but also on plastic and synthetic surfaces such as machining wires, felts, foils, uhle boxes and headbox components. Pitch deposits may also break off resulting in spots and defects in the final paper product which decrease the quality of the paper. Pitch deposits have been removed from process equipment in paper mills, for example, by periodic boil-outs, solvents, or mechanical dislodgement, to maintain cleanliness of equipment and mill systems. Boil-outs can be done, for example, using caustic soda, surfactants, and water at elevated temperatures. The need for such cleanings to remove pitch deposits on equipment typically requires shutdown, and reduces productivity and increase production costs. In addition, production trends may increase pitch problems, for example, the use of high-speed machines that create high shear rates, or higher production rates that increase the load on washing equipment and thus increase the concentration of pitch in the stock, or the reuse of white water and more complete closure which may concentrate pitch and aggravate pitch deposition, such as in bleach plants, and the like.

Past efforts to control pitch problems have widely varied. Pitch control measures have included aging or seasoning wood, the use of wood species with low resin contents, and the modification of pulping parameters. Modifications in pulping parameters may include process variables such as pH, temperature, first-pass retention, washing efficiency, bleaching agent, and the use of process additives, such as cationic polymers, alum, and talc, which have been employed to control pitch problems. For example, the addition of lipase and a cationic polymer to a cellulosic slurry for pitch deposit control has been mentioned. See, e.g., U.S. Pat. No. 5,256,252.

The present investigators have recognized that improved pitch control strategies are useful for paper making processes to reduce pitch deposition on process equipment and paper products to reduce mill equipment cleaning and maintenance requirements, increase product quality, or both. The present inventors further have recognized a need to control pitch and other resin deposit-forming constituents of wood fiber by a treatment of the fibers with a combination of agents which can reduce the content of pitch or other deposit-forming constituents of fiber in a way not predicted from the effects of the individual components.

SUMMARY OF THE PRESENT INVENTION

A feature of the present invention is to provide a method for controlling deposit-forming contaminants that comprise pitch or other fiber components which can interfere with the processing of the fibers, reduce paper quality, or both in paper making systems.

An additional feature of the present invention is to provide a method for controlling deposit-forming organic contaminants which includes contacting fibers with a combination of lipase and at least one peroxide source-free oxidant to liberate the organic contaminants from the fibers.

Another feature of the present invention is to provide paper products which are produced using the indicated combination of components in the indicated methods.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates, in part, to a method for controlling deposition of organic contaminants from fibers in paper making systems that includes treating an aqueous suspension containing fibers with lipase(s) and at least one peroxide source-free oxidant, wherein the organic contaminants include one or more pitch components.

The present invention further relates to a paper product made using the indicated paper making method.

As used herein, "pitch" refers to one or more naturally occurring, hydrophobic, organic resins of low and/or medium molecular weight in wood fiber which include esters of fatty acids with glycerol (such as the triglycerides), as well as other fats, fatty acids, sterols, and waxes, and/or to deposits these resins cause during the pulping and papermaking processes.

As used herein, "peroxide source-free oxidant" refers to an oxidant that is not a hydrogen peroxide source (e.g., hydrogen peroxide itself or a hydrogen peroxide generator) when introduced into or when dissolved or otherwise present in an aqueous medium.

As used herein, a "nonionic surfactant" is an organic compound that is amphiphilic and has no charge group at either terminal end group thereof, wherein the organic compound can lower the surface tension of a liquid, the interfacial tension between two liquids, or that between a liquid and a solid.

As used herein, a "poloxamer" refers to a nonionic triblock copolymer that includes a central block of a hydrophobic polyalkyleneoxide block, which is flanked on both sides with hydrophilic polyalkyleneoxide blocks.

As used herein, a "paper making process" refers to a process wherein fiber is suspended in an aqueous system, mixed with various additives, and then passed to equipment for further processing, e.g., in which the paper, cardboard, tissue, towel etc. is formed, pressed and dried. The paper making process can include processing wherein fiber is treated at a pulping stage, at a paper production stage, or at any combinations thereof.

As used herein, "wood pulp" refers to a lignocellulosic fibrous material, which can be prepared by chemically or mechanically separating cellulose fibers from wood, fiber corps, waste paper, or any combinations thereof.

As used herein, "aqueous system" refers to a fluid system or fluid containing at least 25 wt % liquid phase water. Aqueous systems and fluids also can contain at least 40 wt %, or at least 50%, or more than 50%, or at least 75 wt %, or at least 90 wt % (e.g., 40 wt % to 100 wt %, or 50 wt % to 99 wt %), liquid phase water, based on total weight of the aqueous system.

As used herein, "aqueous fiber suspension" or "aqueous suspension containing fibers" and the like refers to a mixture of components which include a fiber component in an aqueous medium wherein the mixed components that include fiber do not rapidly settle out.

It is to be understood that both the foregoing general description and the following detailed description are exemplary and explanatory only and are intended to provide a further explanation of the present invention, as claimed.

The accompanying drawing, which is incorporated in and constitutes a part of this application, illustrates some of the embodiments of the present invention and together with the description, serves to explain the principles of the present invention.

BRIEF DESCRIPTION OF DRAWING

The FIGURE is a process flow chart for treating fiber in a paper making process according to an example of the present application.

DETAILED DESCRIPTION OF THE PRESENT INVENTION

The present invention relates to control of pitch and/or other resin deposit-forming constituents of wood fiber by a treatment of the fibers in an aqueous suspension with a combination of lipase(s) and peroxide source-free oxidant(s). The treatment of the fibers can reduce the pitch content of the fibers in a way not predicted from the effects of the individual treatment components. There can be strong synergies in pitch control provided by the combination, in an aqueous fiber suspension or other aqueous pitch-containing system, of a lipase with a peroxide source-free oxidant. Experimental tests have been conducted, which are described herein, which show that these improvements and synergies in pitch control can be provided by the indicated combination. While not desiring to be bound by any theory, it is believed that the combined interaction of a lipase and peroxide source-free oxidant with an aqueous fiber suspension can provide enhanced oxidation of unsaturated fatty acids, resin acids, and other pitch components of fibers therein, which yields liberated pitch components or reaction products thereof that are more readily removable or separable from the fiber. These enhanced effects provided by using the indicated lipase and peroxide source-free oxidant components in combination in an aqueous fiber suspension can exceed the arithmetic sum of their separate individual effects thereon. The resulting oxidation products are less hydrophobic (or more hydrophilic) and can be more easily separated or removed from the pulp, such as by washing the pulp, drainage of aqueous content therefrom, or any combinations thereof. This treatment of fiber with the indicated lipase and peroxide source-free oxidant components in combination can provide a reduction of compounds constituting pitch or similar resin deposit-forming constituents in the fibers, and thus can reduce or prevent pitch problems from occurring during paper making processes that involve the treated fibers. The combination of lipase and peroxide source-free oxidant can provide stronger oxidation effects to pitch components than hydrogen peroxide alone or a peroxide source (e.g., a peroxide precursor or generator). The combination of lipase and peroxide source-free oxidant is suitable and useful for pitch control in paper mills including those that do not use peroxide or peroxide sources as a bleaching agent, or where reductions in the usage of peroxide bleaching agents is desirable or can be beneficial. A nonionic surfactant can be included with the combination of lipase and peroxide source-free oxidant, in an aqueous fiber suspension or other aqueous pitch-containing system being treated, to further enhance enzyme activity. Experimental tests have been conducted, which are described herein, which show improvements and synergies in pitch control that can be provided by the indicated further addition of nonionic surfactant with the lipase and peroxide source-free oxidant used to treat an aqueous fiber suspension or other aqueous pitch-containing system. While not desiring to be bound by theory, it is believed that the nonionic surfactant can assist the enzymes to penetrate better into the fiber substrates, providing a better enzyme delivering system and increasing the enzymatically affected portions of the fiber. A product formulation containing the enzyme which can be used in methods of the present invention can contain, for example, lipase, nonionic surfactant when used, water, and other optional ingredients for formulation stabilization. The oxidants are usually not included in and added by the treatment formulation that contains the lipase and any nonionic surfactant. The oxidants also may be included. The oxidants and the formulated product which contains the enzyme and any nonionic surfactant usually are fed separately into the system to be treated. Joint feeding of these components into a system under treatment also may be provided.

The treatment method of the present invention can be used, for example, for reducing or eliminating pitch related problems during paper making processes, thus making better quality paper, or reducing shut down times for paper mill felt washing or conditioning or for cleaning and controlling paper mill deposits, or both. The method for controlling pitch of the present invention can reduce or eliminate the need for cleaning process equipment and related maintenance to remove pitch deposits and can reduce the occurrence of pitch deposits on the paper products of the paper making process to better maintain product quality and value.

The treatment of fiber with the lipase(s) and peroxide source-free oxidant(s) can be performed in a paper making process at any pulping stage, paper production stage, or at any combinations thereof. The treatment with the lipase and peroxide source-free oxidant can get applied through pulping and papermaking processes, such as applied to pulp slurry, process water, white water loop, or any where pitch components can exist in paper making processes. The treatment can be performed for a sufficient time and in sufficient amount of the indicated combination of components to provide treated fibers from which organic contaminants that comprise one or more pitch components liberate from the fibers in greater amount than wherein the fibers are treated with the lipase without the at least one peroxide source-free oxidant being used in combination thereof. The treatment of fiber in paper production in methods of the present invention can be applied in paper mills that are integrated with or non-integrated with pulp mills.

The pitch removal provided by the combined treatment of the fiber with lipase and peroxide source-free oxidant in a system under treatment can be greater than the additive amount of pitch removal obtained individually with the indicated treatment components when used alone. As an option, the treatment of the fiber with lipase and peroxide source-free oxidant removes at least 50%, or at least 60%, or at least 65%, or at least 70%, or at least 75%, or at least 80%, or at least 85%, or at least 90%, or at least 95%, or at least 98%, or at least 99%, by weight of total pitch components present in the fibers prior to the treatment with these components.

As indicated, an aqueous fiber suspension can optionally be treated with the indicated lipase and peroxide source-free oxidant in further combination with at least one nonionic surfactant. As indicated, the pitch removal that can be provided by methods of the present invention can be further increased or synergized by inclusion of one or more nonionic surfactants with the lipase and peroxide source-free oxidant in the aqueous fiber suspension that is being treated. The inclusion of a nonionic surfactant in a system under treatment in combination with the lipase and the at least one peroxide source-free oxidant used to treat the fibers can remove at least about 20% by weight or more, or at least about 23% by weight or more, or at least about 25% by weight or more, or at least about 30% by weight or more, or at least about 35% by weight or more, at least 40% by weight or more, or at least about 45% by weight or more, or at least about 50% by weight or more, or at least about 55% by weight or more, or from about 20% to about 95% by weight more, or from about 20% to about 60% by weight more, or from about 25% to about 55% by weight more, or from about 30% to about 50% by weight more, or from about 35% to about 45% by weight more of total pitch components present in the fibers prior to the treatment than with treating the fibers with the lipase and the at least one peroxide source-free oxidant without the nonionic surfactant.

The FIGURE schematically shows one example of a paper making process 10 applied in an integrated system having a pulp mill 100 and a paper machine 200. In this process, fiber is treated with the indicated lipase, peroxide source-free oxidant and optionally nonionic surfactant at one or more process stages to control the pitch content thereof. Fiber source 11 is shown supplied to the pulp mill 100. Lipase 101, peroxide source-free oxidant 102, and optionally nonionic surfactant 103 can be added to pulp in the pulp mill 100 as part of treatment option 10A. Additional different treatment operations can be performed on the pulp at the pulp mill. These additional treatments can include conventional treatments, which can vary depending on the type of pulp is being produced. The treated pulp 104 that emerges from the pulp mill 100 can be supplied to a paper machine 200 for the making of a paper product 204 from the pulp. Lipase 201, peroxide source-free oxidant 202, and optionally nonionic surfactant 203 can be added to a paper stock or other aqueous fiber suspension derived from the pulp 104 during paper production as part of treatment option 10B. Additional different treatment operations can be performed on the fiber at the paper machine. These additional treatments can include conventional paper making treatments. In this process, at least one or both of treatment options 10A and 10B is applied to fiber used in paper making. Although this illustration shows an integrated paper mill, the methods of the present invention can be used to treat pulp that is formed into market pulp or other pulp which can be stored and transported for later use in paper production on or off-site from the pulp production. As another option, paper stock or white water can be treated at a paper machine with methods of the present invention with market pulp or other pulp obtained from a non-integrated pulp mill and the like used as the starting pulp, which has not been treated with a method of the present invention.

Any suitable lipase may be used in the indicated methods of the present invention. One or more lipases can be used. If more than one type is used, the lipases can be introduced together or separately at the same or different locations. Lipases can include the enzymes classified by EC 3.1.1.3. Reference is made to the Recommendations (1992) of the Nomenclature Committee of the international Union of Biochemistry and Molecular Biology, Academic Press Inc., 1992. Lipase can be derived or isolated from various fungi and/or bacteria, and/or other microorganisms, or from pancreatic sources (e.g., pancreatic lipase). As an option, the lipase can be of microbial origin, in particular of bacterial, fungal, or yeast origin. The lipase can be derived from any source, including, for example, a strain of *Aspergillus*, a strain of *Achromobacter*, a strain of *Bacillus*, a strain of *Candida*, a strain of *Chromobacter*, a strain of *Fusarium*, a strain of *Humicola*, a strain of *Hyphozyma*, a strain of *Pseudomonas* a strain of *Rhizomucor*, a strain of *Rhizopus*, or a strain of *Thermomyces*, or any combinations thereof.

Examples of lipases include, but are not limited to, triacyl glycerol lipase (TAG lipase), triacylglycerol acylhydrolase lipase, or combination thereof. Lipases can include the lipases described, for example, in U.S. Pat. Nos. 6,074,863; 5,507,952; and 5,356,800 and in U.S. Patent Application Publication Nos. 2009/0065159 A1 and 2002/0137655 A1, which are incorporated in their entireties by reference herein. Commercially available products containing lipase can be used. Commercial lipases which can be used, for example, include *Candida antarctica* lipase A, *Candida antarctica* lipase 8, Resinase A2X, Resinase NT, Resinase HT or Novo-Cor® ADL (available from Novozymes A/S), Greasex 50L, PALATASE™ A, PALATASE™ M (available from Novo Nordisk), Pancreatic Lipase 250 (available from Miles Laboratories, Inc.), Lipase G-1000 (available from Genencor), and Optimyze®, Buzyme® 2515, and Buzyme® 2517 (available from Buckman Laboratories International, Inc.).

The lipase used in the present invention can have any positive amount of activity. For instance, the activity can be at least about 5.0 LU/Gm/min, such as at least about 10 LU/Gm/min, or at least about 15 LU/Gm/min, for instance from about 15.0 to about 30.0 LU/Gm/min defined as lipase units per gram per minute (LU/gm/min). The lipases which can have this activity can be, for instance, triacylglycerol lipase or other lipases. For instance, Resinase A2X lipase from Novozyme has activity of about 15.0 to about 20.0 LU/Gm/min defined as lipase units per gram per minute (LU/gm/min).

Total amounts of lipase that can be used in the aqueous fiber suspension for treatment can be, for example, from about 0.01 ppm to about 500 ppm by weight, or from about 0.1 ppm to about 250 ppm by weight, or from about 1 ppm to about 100 ppm by weight, or from about 3 ppm to about 50 ppm by weight, or other amounts, in the aqueous fiber suspension.

It is to be understood that the term lipase, can encompass wild-type lipase enzymes, as well as any variant thereof that retains the activity in question, such as chemically modified or protein engineered mutants. Such variants may be produced by recombinant techniques. The wild-type lipase enzymes may also be produced by recombinant techniques, or by isolation and purification from the natural source. The lipase can be the only one enzyme component present or the major component if added in combination with optional different enzymes to the fiber suspension to be treated. This can be inferred e.g. by fractionation on an appropriate size-exclusion column. Such well-defined, or purified, or highly purified, enzyme can be obtained as is known in the art and/or described in publications relating to the specific enzyme in question. In addition to lipase, more than one type of enzyme can be used, such as two, three, four, or more. Enzymes that may be used as additional enzymes may be, for example, protease, xylanase, cutinase, oxidoreductase, cellulose endoglucanase, amylase, mannanase, steryl esterase, and/or cholesterol esterase activity, or any combinations thereof. Multiple enzymes, if used, can be added as part of a pre-mixture, added separately, or added in any order in forming the composition or in introducing the composition (or components thereof) to the papermaking process. The lipase can be introduced to the aqueous fiber suspension to be treated as an "enzyme preparation," which means a product containing at least one lipase enzyme. In addition to the enzymatic activity such a preparation can contain at least one adjuvant. Examples of adjuvants, which can be used in enzyme preparations for the paper and pulp industry, are, for example, buffers, polymers, surfactants and stabilizing agents.

The peroxide source-free oxidant can be any oxidant with the exception of hydrogen peroxide or a peroxide source. As an option, the peroxide source-free oxidant can be a halogen-containing oxidant which is not a peroxide source. The peroxide source-free oxidant can be, for example, a haloamine, a halamine sulfonamide, an alkali hypohalite salt, an alkaline earth hypohalite salt, a hypohalous acid, chlorine dioxide, a diatomic halogen, a halogenated hydantoin, a halogenated isocyanurate, a halo-oxazolidinone, or any combinations thereof. One or more peroxide source-free oxidants can be used. If more than one type is used, the lipases can be introduced together or separately at the same or different locations.

The halogen-containing oxidant can be, for example, a haloamine, such as monochloramine ($NH_2Cl$), dichloramine ($NHCl_2$), trichloramine ($NCl_3$), monobromamine ($NH_2Br$), dibromamine ($NHBr_2$), tribromamine ($NBr_3$), monoiodamine ($NH_2I$), diiodamine ($NHI_2$), triiodamine ($NI_3$), monofluoramine ($NH_2F$), difluoramine ($NHF_2$), trifluoramine ($NF_3$), or any combinations thereof; an N-halamine sulfonamide such as chloramine T (sodium-N-chloro-p-toluenesulfonamide), dichloramine-T (N,N-dichloro-p-toluenesulfonamide), or any combinations thereof; an alkali hypohalite such as sodium hypochlorite (NaOCl), potassium hypochlorite (KOCl), lithium hypochlorite (LiOCl), sodium hypobromite (NaOBr), potassium hypobromite (KOBr), lithium hypobromite (LiOBr), sodium hypoiodite (NaOI), potassium hypoiodite (KOI), lithium hypoiodite (LiOI), sodium hypofluorite (NaOF), potassium hypofluorite (KOF), lithium hypofluorite (LiOF), or any combinations thereof; an alkaline earth hypohalite such as calcium hypochlorite ($Ca(ClO)_2$), calcium hypobromite ($Ca(BrO)_2$), calcium hypoiodite ($Ca(IO)_2$), calcium hypofluorite ($Ca(FO)_2$), magnesium hypochlorite ($Mg(ClO)_2$), magnesium hypobromite ($Mg(BrO)_2$), magnesium hypoiodite ($Mg(IO)_2$), magnesium hypofluorite ($Mg(FO)_2$), or any combinations thereof; a hypohalous acid such as hypochlorous acid (HOCl), hypobromous acid (HOBO, hypoiodous acid (HOD, hypofluorous acid (HOF), or any combinations thereof; chlorine dioxide ($ClO_2$); a diatomic halogen such as chlorine ($Cl_2$), bromine ($Br_2$), iodine ($I_2$), fluorine ($F_2$), or any combinations thereof; a halogenated isocyanuric acid such as dichloroisocyanuric acid and its sodium and potassium salts, and trichloroisocyanuric acid, or any combinations thereof; a chlorinated or brominated hydantoin such as 1,3-dibromo-5,5-dimethylhydantoin, or any combinations thereof; a halo-oxazolidinone such as N-halo-2-oxazolidinones (e.g., 3-chloro-4,4-dimethyl-2-oxazolidinone), N,N'-dihalo-2-imidazolidinones (e.g., 1,3-dichloro-4,4,5,5,-tetramethyl-2-imidazolidinone), or any combinations thereof.

The peroxide source-free oxidant can be provided in the aqueous fiber suspension to be treated as a solid (e.g., a dry particulate), liquid, gas, slurry, suspension, or any other form that allows the oxidant to be dispersed in an aqueous fiber suspension. For example, a solid particulate form, size, and/or size distribution of oxidant that can be used in the present invention can vary as long as it is dispersible in an aqueous system. The solid particulate forms of the oxidant can be, for example, tablets or free-flowing granules or powder. The solid particulate forms of oxidant can be at least partly soluble or dissolvable in aqueous solutions. The peroxide source-free oxidant also may be formed in situ in an aqueous fiber suspension, such as in the form of a gas, solid or liquid or other dispersible form of oxidant.

With respect to chloramines, for example, chloramines can be derivatives of ammonia by substitution of one, two or three hydrogen atoms with chlorine atoms. Methods for in situ chloramine generation are known which can be adapted for use in the method of the present invention. For example, rather than adding pure chloramine to an aqueous fiber suspension or other aqueous system of a paper making process, sodium hypochlorite solution or chlorine can be added together with ammonia or ammonium salts to generate chloramine in situ. A single type of chloramine or combinations of different chloramines can be used as the oxidant.

With respect to N-halamine sulfonamides which can be used as halogen-containing oxidant materials, examples are chloramine T (sodium-N-chloro-p-toluenesulfonamide) and dichloramine-T (N,N-dichloro-p-toluenesulfonamide). Chloramine T, for example, is commercially available as a white or slightly yellow crystal or crystalline powder containing from about 11.5 to about 13 percent active chlorine. Dichloramine-T is available commercially as pale yellow crystals containing from 28 to about 30 percent active chlorine. Other derivatives of chloramines also may be used as the oxidant. Other N-halamine sulfonamides can be used as the oxidant.

With respect to alkali or alkaline earth hypochlorites, particulate calcium hypochlorite can be used, for example, wherein the size distribution is not necessarily limited as long as the particulates are dispersible. Granular calcium hypochlorite is available commercially, which can be used. Calcium hypochlorite can have a size distribution of from about −10 (2.00 millimeters) to about +45 (0.35 millimeters) U.S. Sieve Series, i.e., the granules can be primarily from about 0.08 inches to about 0.014 inches, or other size distributions. Lithium hypochlorite is available commercially as a free-flowing, white granular product, which may contain about 35 percent available chlorine. Granular lithium hypochlorite generally has a particle size of from about −10 (1.98 millimeters) to about +70 (0.21 millimeters) U.S. Sieve series, or other sizes. Other alkali or alkaline earth hypochlorites can be used as the oxidant in methods of the present invention.

With respect to halogenated isocyanurate oxidants, they can be, for example, chlorinated isocyanurates. Useful chlorinated isocyanurates include dichloroisocyanuric acid and its sodium and potassium salts. Dichloroisocyanuric acid is commonly available as the sodium salt in the form of a white granular substance having from about 62 to about 70 percent available chlorine. Dichloroisocyanuric acid is commercially available in the dihydrate form. Trichloroisocyanuric acid (sometimes called trichlor for brevity) is a white granular powder or granule which is commercially available containing about 90 percent available chlorine. It is often formulated with cyanuric acid in amounts of about 1 part cyanuric acid to from about 2 to 4 parts of trichlor. Other halogenated isocyanurates can be used as the oxidant.

With respect to halogenated hydrantoin oxidants, the oxidant can be halogenated, i.e., brominated and chlorinated, dimethyl hydantoins, such as 1,3-dibromo-5,5-dimethylhydrantoin, 1,3-dichloro-5,5-dimethylhydantoin and 1-bromo-3-chloro-5,5-dimethylhydantoin. 1,3-dibromo-5,5-dimethylhydantoin is available commercially as a free-flowing cream colored powder containing about 55 percent active bromine. 1,3-dichloro-5,5-dimethylhydantoin is commercially available as a white powder containing about 36 percent active chlorine. These hydantoins can be prepared respectively by bromination or chlorination of dimethylhydantoin. 1-bromo-3-chloro-5,5,-dimethylhydantoin is available commercially as a free-flowing white powder containing about 33 percent active bromine and about 14 percent active chlorine. 1-bromo-3-chloro-5,5,-dimethylhydantoin can be prepared by the sequential chlorination and bromination of dimethylhydantoin. Other halogenated hydrantoin oxidants can be used.

With respect to halo-oxazolidone oxidants, the halo-oxazolidinones that can be used can be, for example, 2-oxazolidinones such as 3-chloro-4,4-dimethyl-2-oxazolidinone, 3-chloro-4,4-diethyl-2-oxazolidinone, 3-chloro-4-methyl-4-ethyl-2-oxazolidinone, 3-chloro-4-methyl-4-hydroxy-2-oxazolidinone, 3-chloro-4-methyl-4-methoxy-2-oxazolidinone, 3-chloro-4-methyl-4-hydroxymethyl-2-oxazolidinone, and 3-chloro-4-methyl-4-p-methylphenyl-2-oxazolidinone. Other halo-oxazolidinone derivatives can be used as the oxidant.

The peroxide source-free oxidant can be added to the aqueous fiber suspension for treatment in an amount providing from about 0.05 ppm by weight to about 1000 ppm by weight, or from about 0.2 ppm by weight to about 750 ppm by weight, or from about 2 ppm by weight to about 500 ppm by weight, or from about 5 ppm by weight to about 100 ppm by weight of the at least one peroxide source-free oxidant in the aqueous fiber suspension.

The lipase and at least one peroxide source-free oxidant can be added to the aqueous fiber suspension for treatment in an amount providing from about 0.01 ppm by weight to about 500 ppm by weight lipase and from about 0.05 ppm by weight to about 1000 ppm by weight at least one peroxide source-free oxidant in the aqueous fiber suspension, or from about 0.1 ppm by weight to about 250 ppm by weight lipase and from about 0.2 ppm by weight to about 750 ppm by weight at least one peroxide source-free oxidant in the aqueous fiber suspension, or from about 1 ppm by weight to about 100 ppm by weight lipase and from about 2 ppm by weight to about 500 ppm by weight at least one peroxide source-free oxidant in the aqueous fiber suspension, or other amounts.

As an option, an aqueous fiber suspension in pulp or paper making is treated with the lipase and the peroxide source-free oxidant in further combination with a nonionic surfactant. As indicated, it has been found that additional presence of a nonionic surfactant(s) with the lipase and the peroxide source-free oxidant in the aqueous fiber suspensions being treated can further synergize the enzymatic activity and pitch removal obtained by the fiber treatment.

The nonionic surfactant can be a poloxamer. Poloxamers can be nonionic triblock copolymers that include a central block of a hydrophobic polyalkyleneoxide block, which is flanked on both sides with hydrophilic polyalkyleneoxide blocks. As an option, the polyalkyleneoxide blocks of the poloxamers can independently comprise lower alkylene oxide chains, such as $C_2$, $C_3$, or $C_4$ alkylene oxide chains. As an option, the poloxamer comprises a central block of polypropyleneoxide (PPO) or polybutyleneoxide (PBO), sandwiched between two blocks of polyethylene oxide (PEO). As an option, the poloxamers can be PEO-PPO-PEO copolymers which can have the general formula I: $HO(C_2H_4O)_a(C_3H_6O)_b(C_2H_4O)_aH$, where a and b are the respective average number of EO and PO monomer units in the applicable PEO and PPO block. The PEO-PPO-PEO structure can be a difunctional block copolymer surfactant which terminates in primary hydroxyl groups. Because of their amphiphilic structure, the poloxamers can have nonionic (i.e., no charge) surfactant properties.

Poloxamers can be synthesized sequentially. For example, a central block can be polymerized first from PO to form PPO, then outer PEO blocks can be added to the ends of the central PPO block in a second polymerization step using EO. A commercial source of poloxamers is, for example, PLURONIC® copolymers from BASF Corporation (Florham Park, N.J., U.S.A.).

The physical properties of the poloxamers can range from low-viscosity liquids to pastes to solid, depending upon the precise combination of molecular weight and PEO:PPO ratio. As an option, the mass ratio of total PEO to the PPO can be from about 1:9 to about 9:1, or from about 1:9 to about 8:2, or from about 2:8 to about 8:2, or from about 2.5:7.5 to about 7.5:2.5, or from about 4:6 to about 6:4, or other values. As an option, the PEO proportion comprises at least a predominant amount (i.e., ≥50%) of the total PEO and PPO content of the poloxamer on a mass basis. As an option, a poloxamer which can be used in compositions and methods of the present invention can comprise a PEO:PPO ratio, on a weight:weight (w/w) basis, of from about 50:50: to about 95:5, or from about 60:40 to about 90:10, or from about 75:25 to about 85:15, or from about 78:22 to about 82:18, or about 80:20, or other values. As an option, the poloxamers can have molecular weights, for example, of from about 1,000 g/mol to about 25,000 g/mol, or from about 2,500 to about 22,500 g/mol, or from about 5,000 g/mol to about 20,000 g/mol, or from about 7,500 g/mol to about 18,000 g/mol, or from about 10,000 g/mol to about 16,000 g/mol, or from about 12,000 g/mol to about 15,000 g/mol, or other values. The water solubility of nonionic surfactants such as poloxamers can be related to their hydrophilic-lipophilic balance (HLB) value or number. The HLB value can be calculated in a conventional manner. For example, the HLB value of a poloxamer can be calculated by dividing the molecular weight percent of the hydrophilic portion of the poloxamer by five. For example, a poloxamer containing 80 mole % PEO (total) would have an HLB value calculated to be 16 (i.e., 80/5=16). HLB values that exceed 20 are relative or comparative values. The presence of the hydrophilic PEO terminal portions in the poloxamers means that the surfactant molecules normally have a HLB value which is greater than zero, i.e., they have some hydrophilic character. PPO can have an HLB value close to zero, e.g., less than 0.5. As an option, where the PEO content of the poloxamers comprises a predominant amount of the copolymer, the hydrophilic character of the copolymer can be expected to be more than the molecule's lipophilic character. As an option, the HLB values of poloxamers which contain a predominant amount of PEO can be, for example, at least about 10, or at least about 11, or at least about 12, or at least about 13, or at least about 14, or at least about 15, or at least about 16, or at least about 17, or at least about 18, or at least about 19, or from about 10 to about 19.9, or from about 11 to about 19, or from about 12 to about 18, or from about 13 to about 17.5, or from about 14 to about 17, or other values. As an option, the nonionic surfactant is a poloxamer which has an HLB value of 16 or more.

In BASF's PLURONIC® code, the alphabetical designation can be derived from the physical form of the product at room temperature: L for liquids, P for pastes, and F for flake (solid) forms. In the numerical designation, the last digit multiplied by 10 may indicate the approximate percentage (w/w) of the hydrophilic portions in the PLURONIC® copolymer. Commercial names of the poloxamer which can be used in the present methods and compositions can include, for example, PLURONIC® F38, PLURONIC® F68, PLURONIC® F88, PLURONIC® F98, PLURONIC® F108, PLURONIC® F87, PLURONIC® P105, and PLURONIC® F127. PLURONIC® F108, for example, can comprise about 80% PEO (total):about 20% PPO on a weight:weight (w/w) basis, and an average molecular weight of about 14,600 g/mol.

The amount of the nonionic surfactant used can be, for example, an amount from about 0.5% to about 30% by weight, or from about 1% to about 25% by weight, or from about 2.5% to about 20% by weight, or from about 5% to about 15% by weight, or from about 7.5% to about 17.5% by weight, or from about 10% to about 15% by weight, based on total formulation weight or total weight of the product. The nonionic surfactant can be formulated together with the enzyme in the product formulation. As indicated, the product formulation containing the enzyme which can be used in methods of the present invention usually contain the enzyme, nonionic surfactant when used, water, and other optional ingredients for formulation stabilization, and usually not the oxidants which are usually added separately to a system under treatment. The dosages for the indicated formulation or product which contains the enzyme, nonionic surfactant when used, water, and other ingredients for formulation stabilization can be, for example, from about 0.01 to about 10.0 pound (lb.)/ton dry fiber, or from about 0.1 to about 3.0 lb./ton dry fiber, or from about 0.25 to about 2.5 lb./ton dry fiber, or from about 0.5 to about 2.0 lb./ton dry fiber, or other dosage amounts. The amount of nonionic surfactant dosing to the treated system can be, for example, from about 0.001 to about 5.0 lb./ton dry fiber, or from about 0.0015 to about 3.0 lb./ton dry fiber, or from about 0.01 to about 1.0 lb./ton dry fiber, or from about 0.025 to about 0.75 lb./ton dry fiber, or other dosage amounts.

The lipase, peroxide source free-oxidant, and nonionic surfactant (if used), can be used together, wherein "used together with" means that these components can be introduced simultaneously from the same or separate introduction inlets, or sequentially, to the aqueous fiber suspension to be treated, wherein the introduced components become co-present amongst the fibers in the aqueous fluid being treated. As indicated, the oxidants are usually not included in the formulation which contains the enzyme and nonionic surfactant (if used). The use of lipase, peroxide source free-oxidant, and nonionic surfactant (if used), together usually means that these components are introduced simultaneously or sequentially from separate introduction inlets, or sequentially from the same introduction inlets, to the aqueous fiber suspension under treatment, wherein the introduced components become co-present amongst the fibers in the aqueous fluid being treated. The lipase, peroxide source-free oxidant, and nonionic surfactant (if used), can be added to the fiber suspension in amounts, timing, and mixing which provides substantially homogeneous mixtures in the fiber suspension which contains these components. Enzyme formulations and the peroxide-source-free oxidants can be added separately to the systems to be treated. The order of additions of the enzyme, peroxide-source-free oxidant, and nonionic surfactant (if used), to the aqueous fiber suspension for treatment usually does not affect the efficacy.

The lipase, peroxide source free-oxidant, and nonionic surfactant can be added to an aqueous fiber suspension in an effective amount. As used herein, "effective amount" means an amount sufficient to achieve a desired effect of reducing at least one pitch component, such as, by degrading or converting such one or more components into a form which can be more readily removed from pulp or paper fiber, process water, or both. The aqueous fiber suspensions can be treated with lipase, the at least one peroxide source-free oxidant, and the non-ionic surfactant in added amounts providing from about 0.01 ppm to about 500 ppm by weight lipase and from about 0.05 ppm to about 1000 ppm by weight at least one peroxide source-free oxidant in the aqueous suspension, and optionally from about 0.001 to about 5.0 lb./ton dry fiber non-ionic surfactant, in the aqueous fiber suspension under treatment. As an option, the aqueous fiber suspensions can be treated with from about 0.1 ppm to about 250 ppm by weight lipase and from about 0.2 ppm to about 750 ppm by weight of at least one peroxide source-free oxidant, and from about 0:0015 to about 3.0 lb./ton dry fiber non-ionic surfactant, in the aqueous suspension. As another option, the aqueous fiber suspensions can be treated with from about 1 ppm to about 100 ppm by weight lipase and from about 2 ppm to about 500 ppm by weight of at least one peroxide source-free oxidant, and from about 0.01 to about 1.0 lb./ton dry fiber nonionic surfactant, in the aqueous suspension.

The treatment using lipase and the peroxide source-free oxidant, and optionally additionally nonionic surfactant, according to a method of the present invention is not limited to treating any particular type of pulp or paper and can be used in all grades of paper, Kraft paper, sulfite paper, semichemical paper, and the like, including paper produced using bleached pulp, unbleached pulp, or combinations thereof. For example, the pitch control improvements provided using methods of the present invention can be provided in different types of pulps. For example, the pulp to be treated can comprise virgin pulp and/or recycled pulp, such as virgin sulfite pulp, broke pulp, a hardwood kraft pulp, a softwood kraft pulp, mixtures of such pulps, and the like. The recycled pulp can be or include waste paper, old corrugated containers (OCC), and other used paper products and materials. In addition to the above-indicated pulps, there are a variety of additional pulps to which the method of this invention can be applied. For example, thermomechanical pulp (TMP), stone groundwood (SGW), chemithermomechanical pulp (CTMP), and other pulps can be treated by a method of the present invention. Different types of pulp may require different types of paper production although many papers can use a combination or "blend" of several different types of pulp and recycled/recovered paper. The papermaking pulp or stock can contain cellulose fibers in an aqueous medium at a concentration, for example, of at least about 50% by weight, or at least about 60% by weight, or at least about 70% by weight, or at least about 80% by weight, or at least about 90% by weight, of the total dried solids content in the pulp or stock, though other concentrations may be used. These pulp formulations can form the basis of paper stock or fiber furnishes directly or after addition of one or more paper making additives. The fibers that can be treated in aqueous suspensions by methods of the present invention can comprise cellulosic fibers at least in part. The cellulosic fibers can be virgin cellulosic fibers, waste cellulosic fiber from pulp or paper making, recycled cellulosic fibers, or any combinations thereof. The fibers treated by methods of the present invention can be up to 100% by weight cellulosic fiber content based on total fiber content. The fibers treated can be mixtures of cellulosic fibers and non-cellulosic fibers. For example, the fiber mixtures can comprise from about 1-99 wt % cellulosic fibers and from about 99-1 wt % non-cellulosic fibers, or from about 10-99 wt % cellulosic fibers and from about 90-1 wt % non-cellulosic fibers, or from about 25-99 wt % cellulosic fibers and from about 75-1 wt % non-cellulosic fibers, or from about 50-99 wt % cellulosic fibers and from about 50-1 wt %, or from about 75-99 wt % cellulosic fibers and from about 25-1 wt % non-cellulosic fibers non-cellulosic fibers, or other mixtures, based on total weight of mixed fibers. The process of the present invention can specifically provide benefits when applied to the treatment of pitch-containing fibers or pulps, which may not apply to non-cellulosic fibers, although the methods of the present invention can accommodate the presence of pitch free-containing fibers.

The methods of the present invention can be carried out, for example, at any pulp or paper production stage in which the indicated treating agents of lipase, peroxide source-free oxidant (and optional nonionic surfactant) can be dispersed in an aqueous fiber suspension. The lipase and peroxide-source free oxidant (and optional nonionic surfactant) can be added directly or indirectly or both to an aqueous fiber suspension.

The lipase and peroxide-source free oxidant (and optional nonionic surfactant) can be added, for example, to any holding tank, e.g., to a pulp storing container (storage chest), storage tower, mixing chest or metering chest. The lipase and the peroxide source-free oxidant (and optional nonionic surfactant) can be added, for example, to an aqueous suspension of fiber prior to, during, and/or after a pulping stage. In a Kraft pulping process, for example, the lipase and peroxide-source free oxidant (and optional nonionic surfactant) can be added during brown-stock washing. The treatment can be applied, for example, to pulp after a pulping stage and before paper production. The treatment can be applied, for example, to a paper stock or furnish, to circulated process water, to white water, or any combinations thereof. The lipase and the peroxide source-free oxidant (and optional nonionic surfactant) can be added, for example, to the aqueous suspension of fiber during or before a stock preparation stage, prior to introduction of an aqueous suspension of fiber to a paper machine headbox, to paper machine white water (e.g., a white water loop), or other paper production process locations, or any combinations thereof. The indicated treating agents can be added directly to a fiber-containing aqueous suspension, or indirectly thereto from a process water or other fluid added thereto, or any combinations thereof. Process water can include, for example, water added as a raw material to the paper manufacturing process, intermediate water products or byproducts resulting from any step of the process for manufacturing the paper material, or any combinations thereof. The process water can be intended for circulation or recirculation, i.e., re-used in the same or another step of the process. The term "water" can mean any aqueous medium, solution, suspension, including, for example, municipal tap water, and tap water in admixture with any various additives and adjuvants commonly used in paper manufacturing processes.

The treatment of an aqueous fiber suspension with the lipase, peroxide source-free oxidant, optional nonionic surfactant, and any additional active agents such as described herein, can be done before washing or drainage of the suspension is performed during pulping and/or paper production. After treatment with the lipase and peroxide source-free oxidant (and any nonionic surfactant), pitch components can be removed more easily from the fibers using a washing or drainage operation. For example, a kraft pulp mill typically can have multiple washing stages in series (e.g., 3-5 stages). Washing stages can also be placed after oxygen delignification and between any bleaching stages as well. Pulp washers can use counter current flow between the stages such that the pulp moves in the opposite direction to the flow of washing waters. Several types of washing equipment which can be used are pressure diffusers, atmospheric diffusers, vacuum drum washers, drum displacers, and wash presses. Screening and cleaning operations, for example, also are commonly included in pulp mills after pulp formation (e.g., chemical pulping, mechanical pulping, or both), and before any bleaching, which can include washing or drainage of the pulp. In some pulp cleaners, dilution water can be introduced which can assist in liberating the treated pitch components from the pulp. Pulp screening processes can be used wherein pulp is wet laid on a wire section to collect the fiber (accepts) on the wire section and water drained from the pulp through the wire section (e.g., white water) can contain liberated pitch components from an earlier treatment of the pulp fiber with the indicated lipase and peroxide source-free oxidant combination. In this way, the liberated pitch components can be separated into white water of the pulp processing. In paper machine processes, paper stock can be treated, for example, in stock preparation, in the approach flow system, at the wet end, or any combinations of these, with the lipase and peroxide source-free oxidant (and any nonionic surfactant or additional active agents such as described herein). In the forming section, also called the wet end, the slurry of fibers can have liquid content containing liberated pitch components drained through a wire section whereas the treated fiber is collected as a web formed on the wire section. In this way, the liberated pitch components can be separated from the treated fiber into white water of the paper machine.

In general, the temperature and pH of the aqueous fiber suspension or feed liquids into which the lipase is introduced should not be deactivating with respect to the enzyme. The combination of lipase and oxidant plus nonionic surfactant can be in contact with the fiber for a time period, for example, of from about 30 minutes to about 48 hours, or from about 1 hour to about 24 hours, or from about 3 hours to about 12 hours, or other time periods. The contact time range can be same, or substantially the same (e.g., ±10%), for treating pulp versus papermaking stock or white water, or other aqueous fiber suspensions and systems. Normal process temperatures and pHs of pulp mill and paper machine can be used. The normal application temperature range for the combination of lipase/oxidant/nonionic surfactant can be, for example, from about 30° C. to about 65° C., or from about 35° C. to about 60° C., or from 40° C. to about 55° C., or other temperatures. The normal application pH range for the combination of lipase/oxidant/nonionic surfactant can be, for example, from about 3.5 to about 10.0, or from about 4.0 to about 9.5, or from about from about 4.5 to about 9.0, or other pH values.

Paper products produced with treated fiber according to the methods of the present invention are also provided. The fibers treated by methods of the present invention can be formed into a paper product in any suitable manner. For example, the treated fibers can be collected on a wire section, and then processed in conventional manners, such as processing in a press section, a calendering section, and optional coating section, to form paper. The paper products can be, for example, printable or inkable paper sheets, sheets for corrugated cardboard construction, linerboard, tissue paper, hygiene and personal care sheet or liner materials, other paper-based products, or any combinations thereof.

Total amounts of lipase that can be provided in paper products of the present invention can be, for example, from about 0.005 lbs. to about 4 lbs. per ton of dry fiber treated, or from about 0.01 to about 2 lbs. per ton of dry fiber treated, or from about 0.01 to about 1.5 lbs. per ton of dry fiber treated, or other amounts.

The present invention includes the following aspects/embodiments/features in any order and/or in any combination:

1. The present invention relates to a method for controlling deposition of organic contaminants from fibers in paper making systems, comprising treating an aqueous suspension containing fibers with at least one lipase and at least one peroxide source-free oxidant, wherein the organic contaminants comprise one or more pitch components.

2. The method of any preceding or following embodiment/feature/aspect, wherein the treating is for a sufficient time and in a sufficient amount to provide treated fibers from which organic contaminants from the fibers in greater amount than wherein the fibers are treated with the lipase and without the at least one peroxide source-free oxidant, wherein the organic contaminants comprise one or more pitch components, wherein the organic contaminants comprise one or more pitch components.

3. The method of any preceding or following embodiment/feature/aspect, wherein the at least one peroxide source-free oxidant is a halogen-containing oxidant.

4. The method of any preceding or following embodiment/feature/aspect, wherein the at least one peroxide source-free oxidant is a haloamine, a halamine sulfonamide, an alkali hypohalite salt, an alkaline earth hypohalite salt, a hypohalous acid, chlorine dioxide, a diatomic halogen, a halogenated hydantoin, a halogenated isocyanurate, a halo-oxazolidinone, or any combinations thereof.

5. The method of any preceding or following embodiment/feature/aspect, wherein the lipase is a triacylglycerol (TAG) lipase.

6. The method of any preceding or following embodiment/feature/aspect, wherein the lipase is derived from a strain of *Candida*.

7. The method of any preceding or following embodiment/feature/aspect, wherein the fibers comprise virgin cellulosic fibers.

8. The method of any preceding or following embodiment/feature/aspect, wherein the treating removes at least 50% by weight of total pitch components present in the fibers prior to the treating.

9. The method of any preceding or following embodiment/feature/aspect, wherein the lipase and the at least one peroxide source-free oxidant are added to the aqueous suspension in an amount providing from about 0.01 ppm by weight to about 500 ppm by weight lipase and from about 0.05 ppm by weight to about 1000 ppm by weight at least one peroxide source-free oxidant in the aqueous suspension.

10. The method of any preceding or following embodiment/feature/aspect, further comprising treating the aqueous suspension with at least one nonionic surfactant in combination with the lipase and the at least one peroxide source-free oxidant.

11. The method of any preceding or following embodiment/feature/aspect, wherein the nonionic surfactant is a poloxamer.

12. The method of any preceding or following embodiment/feature/aspect, wherein the nonionic surfactant is a poloxamer having an HLB value of 16 or more.

13. The method of any preceding or following embodiment/feature/aspect, wherein the lipase, the at least one peroxide source-free oxidant, and the non-ionic surfactant are added in an amount providing from about 0.01 ppm to about 500 ppm by weight lipase and from about 0.05 ppm to about 1000 ppm by weight at least one peroxide source-free oxidant, and from about 0.001 to about 5.0 lb./ton dry fiber nonionic surfactant, in the aqueous suspension.

14. The method of any preceding or following embodiment/feature/aspect, wherein the lipase is added in an amount providing from about 0.1 to about 1.5 pounds lipase per ton of dry fiber.

15. The method of any preceding or following embodiment/feature/aspect, wherein the aqueous suspension is a pulp.

16. The method of any preceding or following embodiment/feature/aspect, wherein the lipase and the at least one peroxide source-free oxidant are added to the aqueous suspension prior to a pulping stage.

17. The method of any preceding or following embodiment/feature/aspect, wherein the lipase and the at least one peroxide source-free oxidant are added to the aqueous suspension during a pulping stage.

18. The method of any preceding or following embodiment/feature/aspect, wherein the aqueous suspension is a papermaking stock.

19. The method of any preceding or following embodiment/feature/aspect, wherein the lipase and the at least one peroxide source-free oxidant are added to the aqueous suspension during or before a stock preparation stage.

20. The method of any preceding or following embodiment/feature/aspect, wherein the lipase and the at least one peroxide source-free oxidant are added prior to introduction of the aqueous suspension to a paper machine headbox.

21. The method of any preceding or following embodiment/feature/aspect, wherein the lipase and the at least one peroxide source-free oxidant are added to paper machine white water.

22. The method of any preceding or following embodiment/feature/aspect, wherein the aqueous suspension containing the lipase and the at least one peroxide source-free oxidant is in contact with the fibers for a time of from about 30 minutes to about 48 hours.

23. The method of any preceding or following embodiment/feature/aspect, further comprising forming the fibers into a paper product.

24. The method of any preceding or following embodiment/feature/aspect, wherein the paper product is paper, linerboard, tissue, corrugated paperboard, or any combinations thereof.

25. The method of any preceding or following embodiment/feature/aspect, further comprising forming the fibers into a paper product.

26. The method of any preceding or following embodiment/feature/aspect, wherein said at least one lipase is added separately from any peroxide-free oxidant, and said at least one peroxide source-free oxidant is added separately from any lipase, to said aqueous suspension containing fibers. As an option, the peroxide-free oxidant is not pre-combined with any lipase and/or nonionic surfactant, but may interact with each other once in the aqueous suspension.

27. The method of any preceding or following embodiment/feature/aspect, wherein said at least one lipase and said at least one nonionic surfactant are added separately from any peroxide-free oxidant, and said at least one peroxide source-free oxidant is added separately from any lipase and nonionic surfactant, to said aqueous suspension containing fibers.

28. A paper product of the method of any preceding or following embodiment/feature/aspect.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be only exemplary of the present invention. Unless indicated otherwise, all amounts, percentages, ratios and the like used herein are by weight.

EXAMPLES

Example 1

Dammar resin was used as a model pitch in lab evaluation to simulate the pitch from pulp and paper processes. 75 mg Dammar resin was added in a flask containing 75 ml DI water. Lipase, oxidant, or a combination of lipase/oxidant was added to the flasks as shown in Table 1. The contents of the flasks were stirred for 5 hours at room temperature. The turbidity of the liquid in each flask was determined using a spectrophotometer at 600 nm The testing results are shown in Table 1.

TABLE 1

Turbidity ($A_{600\,nm}$) of Dammar resin solution after 5 hr treatment with lipase, oxidant, and the combination of lipase/oxidant.

| Treatment | Dosage (ppm) | $A_{600\,nm}$ (Turbidity) | Increase in $A_{600\,nm}$ |
|---|---|---|---|
| Control - Dammar resin only | — | 0.0793 | — |
| Tag Lipase | 667 | 0.2163 | 0.1370 |
| $ClO_2$ | 2 | 0.1426 | 0.0633 |
| Tag lipase + $ClO_2$ | *667 + 2 | 0.3857 | 0.3064 |

*667 ppm of Tag lipase + 2 ppm of $ClO_2$ (as active chlorine dioxide).

Dammar resin is normally insoluble in water. As shown by the testing results in Table 1, after 5 hours stirring at room temperature, the control sample (Dammar resin only) remained clear as indicated by a very low turbidity. The resin was observed at the bottom or on the wall of the flask for the control sample. The other three samples treated with Tag lipase, $ClO_2$, or the combination of lipase/$ClO_2$ turned into milky emulsion. The turbidity results demonstrated that the combination treatment leads to a much better emulsification of Dammar resin than either Tag lipase alone or $ClO_2$ alone. The combination treatment clearly showed strong synergy. The turbidity increase by the combination was much greater than the sum of the turbidity increase by the two individual treatments, i.e., Tag lipase alone and $ClO_2$ alone. The emulsified resin is less hydrophobic and much easier to be washed from the pulp. This can lead to the reduction of compounds constituting pitch or deposit, thus reducing pitch problems during paper making process.

Example 2

Oleic acid is an unsaturated fatty acid. It is one of the major components of pitch deposit from pulp and paper manufacture. In this example, oleic acid was used as the substrate for evaluating the emulsification efficacy of lipase, oxidants, and combination of lipase/oxidant. 75 mg oleic acid was added in a flask containing 75 ml DI water. Lipase, oxidant, or a combination of lipase/oxidant was added to the flasks as shown in Table 2. The contents of the flasks were stirred for 5 hours at room temperature. The turbidity of the liquid in each flask was determined using a spectrophotometer at 600 nm. The testing results are shown in Table 2.

TABLE 2

Turbidity ($A_{600\,nm}$) of oleic acid solution after 5 hr treatment with lipase, oxidant, and the combination of lipase/oxidant.

| Treatment | Dosage (ppm) | $A_{600\,nm}$ (Turbidity) | Increase in $A_{600\,nm}$ |
|---|---|---|---|
| Control - Oleic acid only | — | 0.0218 | — |
| Tag Lipase | 667 | 0.1409 | 0.1191 |
| $ClO_2$ | 2 | 0.0862 | 0.0644 |
| Tag lipase + $ClO_2$ | 667 + 2 | 0.3729 | 0.3511 |
| Monochloroamine (MCA) | 2 | 0.0808 | 0.0590 |
| Tag lipase + MCA | 667 + 2 | 0.3860 | 0.3642 |

As shown by the testing results in Table 2, both chlorine dioxide and monochloroamine were effective to emulsify oleic acid into the solution when combined with tag lipase. Individual treatment, either tag lipase alone or oxidant alone was much less effective. These results are similar to that presented in Example 1 with Dammar resin.

Example 3

Non-ionic surfactant, PLURONIC® F108, was evaluated for its effectiveness to enhance the activity of lipase plus oxidant to emulsify oleic acid in water. PLURONIC® F108 was added to the Tag lipase formulation at 2.5, 5.0, 7.5, and 10.0% by weight. 75 mg oleic acid was added in a flask containing 75 ml DI water. 2 ppm of $Cl_2$ was added to the flask. 2000 mg of Tag lipase formulation (Table 3) containing the PLURONIC®F108 was added to provide 677 ppm of Tag lipase. The contents of the flasks were stirred for 5 hours at room temperature. The turbidity of the liquid in each flask was determined using a spectrophotometer at 600 nm. The testing results are shown in Table 3.

TABLE 3

Turbidity ($A_{600\ nm}$) of oleic acid solution after 5 hr treatment with Tag lipase formulas containing various amounts of PLURONIC ® F108.

| Treatment | Wt. % PLURONIC ® F108 | $A_{600\ nm}$ (Turbidity) | % $A_{600\ nm}$ increase vs formula-5 |
|---|---|---|---|
| Control -1: Oleic acid only | — | 0.0225 | — |
| Control-2: PLURONIC ® F108 only | — | 0.0812 | — |
| Tag Lipase formula -1 | 2.5 | 0.4881 | 25.99 |
| Tag Lipase formula -2 | 5.0 | 0.5426 | 40.06 |
| Tag Lipase formula -3 | 7.5 | 0.6198 | 60.00 |
| Tag Lipase formula -4 | 10.0 | 0.4648 | 19.98 |
| Tag Lipase formula -5 | 0.0 | 0.3874 | — |

*Tag lipase formulae 1-5 each contains 2.5% Tag lipase. 2 ppm of $ClO_2$ was added separately to each treatment with Tag lipase formula. For the PLURONIC ® F108 only treatment, 200 mg of PLURONIC ® F108 was added to the flask containing oleic acid.

The testing results in Table 3 demonstrate that non-ionic surfactant (PLURONIC® F108) strongly enhanced the activity of the combination of Tag lipase plus $ClO_2$ for emulsifying oleic acid in water. The optimal amount of PLURONIC® F108 in Tag lipase formulation for these experimental tests was 7.5%. Tag Lipase Formulae 1-5 all had increased turbidity values compared to the controls. Significant further improvement in the efficacy of emulsifying oleic acid was observed with adding PLURONIC® F108 at 2.5 to 10% into the formulation. This is shown by the increased turbidity values for the Tag Lipase Formulae 1-4, which included PLURONIC® F108, as compared to that of Tag Lipase formula 5, which did not include PLURONIC® F108.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for controlling deposition of organic contaminants from fibers in paper making systems, comprising treating an aqueous suspension containing fibers with at least one lipase and at least one peroxide source-free oxidant, wherein the organic contaminants comprise one or more pitch components, and the at least one peroxide source-free oxidant comprises a haloamine, a halamine sulfonamide, an alkali hypohalite salt, an alkaline earth hypohalite salt, a hypohalous acid, chlorine dioxide, a diatomic halogen, a halogenated hydantoin, a halogenated isocyanurate, a halo-oxazolidinone, or any combinations thereof.

2. The method of claim 1, wherein the treating is for a sufficient time and in sufficient amount to provide treated fibers from which organic contaminants liberate from the fibers in greater amount than where the fibers are treated with the lipase and without the at least one peroxide source-free oxidant, wherein the organic contaminants comprise one or more pitch components.

3. The method of claim 1, wherein the at least one peroxide source-free oxidant is a halogen-containing oxidant.

4. The method of claim 1, wherein the at least one peroxide source-free oxidant is a haloamine, a halamine sulfonamide, an alkali hypohalite salt, an alkaline earth hypohalite salt, a hypohalous acid, chlorine dioxide, a diatomic halogen, a halogenated hydantoin, a halogenated isocyanurate, a halo-oxazolidinone, or any combinations thereof.

5. The method of claim 1, wherein the lipase is a triacylglycerol (TAG) lipase.

6. The method of claim 1, wherein the lipase is derived from a strain of *Candida*.

7. The method of claim 1, wherein the fibers comprise virgin cellulosic fibers.

8. The method of claim 1, wherein the treating removes at least 50% by weight of total pitch components present in the fibers prior to the treating.

9. The method of claim 1, wherein the lipase and the at least one peroxide source-free oxidant are added to the aqueous suspension in an amount providing from about 0.01 ppm by weight to about 500 ppm by weight lipase and from about 0.05 ppm by weight to about 1000 ppm by weight at least one peroxide source-free oxidant in the aqueous suspension.

10. The method of claim 1, further comprising treating the aqueous suspension with at least one nonionic surfactant in combination with the lipase and the at least one peroxide source-free oxidant.

11. The method of claim 10, wherein the nonionic surfactant is a poloxamer.

12. The method of claim 10, wherein the nonionic surfactant is a poloxamer having an HLB value of 16 or more.

13. The method of claim 10, wherein the lipase, the at least one peroxide source-free oxidant, and the non-ionic surfactant are added in an amount providing from about 0.01 ppm to about 500 ppm by weight lipase and from about 0.05 ppm to about 1000 ppm by weight at least one peroxide source-free oxidant, and from about 0.001 to about 5.0 lb./ton dry fiber nonionic surfactant, in the aqueous suspension.

14. The method of claim 10, further comprising forming the fibers into a paper product.

15. The method of claim 10, wherein said at least one lipase and said at least one nonionic surfactant are added separately from any peroxide-free oxidant, and said at least one peroxide source-free oxidant is added separately from any lipase and nonionic surfactant, to said aqueous suspension containing fibers.

16. The method of claim 10, wherein the nonionic surfactant is a PLURONIC® copolymer.

17. The method of claim 16, wherein the PLURONIC® copolymer comprises PLURONIC® F38, PLURONIC®

F68, PLURONIC® F88, PLURONIC® F98, PLURONIC® F87, PLURONIC® P105, or PLURONIC® F127.

18. The method of claim 16, wherein the PLURONIC® copolymer comprises PLURONIC® F108.

19. The method of claim 1, wherein the lipase is added in an amount providing from about 0.1 pound to about 1.5 pounds lipase per ton of dry fiber.

20. The method of claim 1, wherein the aqueous suspension is a pulp.

21. The method of claim 1, wherein the lipase and the at least one peroxide source-free oxidant are added to the aqueous suspension prior to a pulping stage.

22. The method of claim 1, wherein the lipase and the at least one peroxide source-free oxidant are added to the aqueous suspension during a pulping stage.

23. The method of claim 1, wherein the aqueous suspension is a papermaking stock.

24. The method of claim 1, wherein the lipase and the at least one peroxide source-free oxidant are added to the aqueous suspension during or before a stock preparation stage.

25. The method of claim 1, wherein the lipase and the at least one peroxide source-free oxidant are added prior to introduction of the aqueous suspension to a paper machine headbox.

26. The method of claim 1, wherein the lipase and the at least one peroxide source-free oxidant are added to paper machine white water.

27. The method of claim 1, wherein the aqueous suspension containing the lipase and the at least one peroxide source-free oxidant is in contact with the fibers for a time of from about 30 minutes to about 48 hours.

28. The method of claim 1, further comprising forming the fibers into a paper product.

29. The method of claim 28, wherein the paper product is paper, linerboard, tissue, corrugated paperboard, or any combinations thereof.

30. The method of claim 1, wherein said at least one lipase is added separately from any peroxide-free oxidant, and said at least one peroxide source-free oxidant is added separately from any lipase, to said aqueous suspension containing fibers.

31. The method of claim 1, wherein the at least one peroxide source-free oxidant is a haloamine.

32. The method of claim 31, wherein the haloamine is monochloramine ($NH_2Cl$), dichloramine ($NHCl_2$), trichloramine ($NCl_3$), monobromamine ($NH_2Br$), dibromamine ($NHBr_2$), tribromamine ($NBr_3$), monoiodamine ($NH_2I$), diiodamine ($NHI_2$), triiodamine ($NI_3$), or any combination thereof.

33. The method of claim 1, wherein the at least one peroxide source-free oxidant is an N-halamine sulfonamide.

34. The method of claim 33, wherein the N-halamine sulfonamide comprises chloramine T (sodium-N-chloro-p-toluenesulfonamide), dichloramine-T (N,N-dichloro-p-toluenesulfonamide), or both.

35. The method of claim 1, wherein the at least one peroxide source-free oxidant is an alkali hypohalite.

36. The method of claim 35, wherein the alkali hypohalite comprises sodium hypochlorite (NaOCl), potassium hypochlorite (KOCl), lithium hypochlorite (LiOCl), sodium hypobromite (NaOBr), potassium hypobromite (KOBr), lithium hypobromite (LiOBr), sodium hypoiodite (NaOI), potassium hypoiodite (KOI), lithium hypoiodite (LiOI), sodium hypofluorite (NaOF), potassium hypofluorite (KOF), lithium hypofluorite (LiOF), or any combination thereof.

37. The method of claim 1, wherein the at least one peroxide source-free oxidant is an alkaline earth hypohalite.

38. The method of claim 37, wherein the alkaline earth hypohalite comprises calcium hypochlorite ($Ca(ClO)_2$), calcium hypobromite ($Ca(BrO)_2$), calcium hypoiodite ($Ca(IO)_2$), calcium hypofluorite ($Ca(FO)_2$), magnesium hypochlorite ($Mg(ClO)_2$), magnesium hypobromite ($Mg(BrO)_2$), magnesium hypoiodite ($Mg(IO)_2$), magnesium hypofluorite ($Mg(FO)_2$), or any combination thereof.

39. The method of claim 1, wherein the at least one peroxide source-free oxidant is a hypohalous acid.

40. The method of claim 39, wherein the hypohalous acid comprises hypochlorous acid (HOCl), hypobromous acid (HOBr), hypoiodous acid (HOI), hypofluorous acid (HOF), or any combination thereof.

41. The method of claim 1, wherein the at least one peroxide source-free oxidant is chlorine dioxide ($ClO_2$).

42. The method of claim 1, wherein the at least one peroxide source-free oxidant is a diatomic halogen.

43. The method of claim 42, wherein the diatomic halogen comprises chlorine ($Cl_2$), bromine ($Br_2$), iodine ($I_2$), fluorine ($F_2$), or any combination thereof.

44. The method of claim 1, wherein the at least one peroxide source-free oxidant comprises a halogenated isocyanuric acid.

45. The method of claim 44, wherein the halogenated isocyanuric acid comprises dichloroisocyanuric acid and its sodium and potassium salts, and trichloroisocyanuric acid, or any combination thereof.

46. The method of claim 1, wherein the at least one peroxide source-free oxidant is a chlorinated or brominated hydantoin.

47. The method of claim 46, wherein the chlorinated or brominated hydantoin is 1,3-dibromo-5,5-dimethylhydantoin.

48. The method of claim 1, wherein the at least one peroxide source-free oxidant is a halo-oxazolidinone.

49. The method of claim 48, wherein the halo-oxazolidinone comprises an N-halo-2-oxazolidinone, an N,N'-dihalo-2-imidazolidinone, or both.

50. The method of claim 1, wherein the lipase comprises Resinase NT, Resinase HT, NovoCor® ADL, Greasex 50L, Optimyze®, Buzyme® 2515, or Buzyme® 2517.

51. The method of claim 1, wherein the lipase comprises Resinase A2X.

* * * * *